(12) United States Patent
Sahara et al.

(10) Patent No.: US 7,328,931 B2
(45) Date of Patent: Feb. 12, 2008

(54) VEHICLE SUN VISOR APPARATUS

(75) Inventors: Hideshi Sahara, Toyohashi (JP); Hiromi Suzuki, Kakegawa (JP); Hidetoshi Suzuki, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 5 days.

(21) Appl. No.: 11/423,341

(22) Filed: Jun. 9, 2006

(65) Prior Publication Data

US 2006/0279101 A1 Dec. 14, 2006

(30) Foreign Application Priority Data

Jun. 14, 2005 (JP) ............................. 2005-173833

(51) Int. Cl.
*B60J 3/00* (2006.01)
(52) U.S. Cl. ..................................... 296/97.4
(58) Field of Classification Search ............... 296/97.2, 296/97.8, 97.1, 97.4
See application file for complete search history.

(56) References Cited

U.S. PATENT DOCUMENTS 6,131,987 A * 10/2000 Rossiter ..................... 296/97.8

6,759,643 B2 * 7/2004 Su et al. ................ 250/214 AL

FOREIGN PATENT DOCUMENTS

| JP | 61125917 A | * | 6/1986 |
| JP | 2004-136807 | | 5/2004 |
| JP | 2005-132148 | | 5/2005 |
| JP | 2005-132243 | | 5/2005 |

* cited by examiner

*Primary Examiner*—Joseph D. Page
(74) *Attorney, Agent, or Firm*—Marsh Fischmann & Breyfogle LLP (57) ABSTRACT

A sun visor apparatus for vehicle including a wiper apparatus that wipes a wipe area defined on an outer surface of a windshield. A light receiving sensor is arranged in the vehicle compartment facing toward the wipe area. When the windshield is stained by mud or bird feces, this does not interfere with the incident light received by the light receiving sensor as long as the wiper apparatus wipes the outer surface of the windshield. Accordingly, the light receiving sensor outputs an incident light detection signal that accurately corresponds to the incident light. A light shield body is properly extended and retracted in accordance with the incident light detection signal.

5 Claims, 12 Drawing Sheets

VEHICLE SUN VISOR APPARATUS

BACKGROUND OF THE INVENTION

The present invention relates to a vehicle sun visor apparatus, and more particularly, to a vehicle sun visor apparatus for moving a light shield body forward and rearward by driving a drive motor based on an incident light detection signal from a light receiving sensor.

Japanese Laid-Open Patent Publication No. 2004-136807 describes an example of a vehicle sun visor apparatus including a light receiving sensor, which is located on the surface of a rearview mirror arranged on the front glass. A light receiving sensor includes a plurality of light receiving elements, each receiving light such as sunlight. Based on the light received by the light receiving elements, the light receiving sensor outputs an incident light detection signal. The sun visor apparatus automatically moves a sun visor forward or rearward in accordance with the detection signal.

The rearview mirror is normally arranged on the central upper portion of the front glass. Thus, the rearview mirror interferes with the driver's view at the central upper portion of the front glass. For this reason, even though the wiper does not wipe the central upper portion of the front glass where the rearview mirror is located, the driver's view would not be significantly affected.

However, the light receiving sensor described in the above publication may be located in the vehicle compartment at a position that does not correspond to the wiping area of the wiper. In such a case, if the front glass is stained by, for example, mud or bird feces at a portion that is not wiped by the wiper, the light receiving sensor may not be able to accurately receive light. As a result, the sun visor may not properly be moved forward or rearward.

SUMMARY OF THE INVENTION

The present invention provides a vehicle sun visor apparatus that accurately receives light with a light receiving sensor to properly move a light shield body forward and rearward.

One aspect of the present invention is a sun visor apparatus for use in a vehicle having a body, a vehicle compartment, a windshield, and a wiper apparatus for wiping a wipe area of the windshield. The sun visor apparatus includes a drive motor mountable to the body of the vehicle. A light shield body is movable forward and rearwards by the drive motor. The light shied body shields out at least some of incident light entering the vehicle compartment of the vehicle through the windshield. A light receiving sensor receives the incident light and produces an incident light detection signal. The light receiving sensor is arranged in the vehicle compartment of the vehicle facing toward the wipe area. A controller receives the light detection signal and drives the drive motor based on the incident light detection signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The present invention will now be discussed with reference to the drawings. The members and arrangements discussed hereafter do not limit the present invention and various changes may naturally be made thereto in accordance with the objects of the present invention.

The structure of a vehicle sun visor apparatus 10 according to a preferred embodiment of the present invention will now be described with reference to FIGS. 1 to 11.

Figure 1:
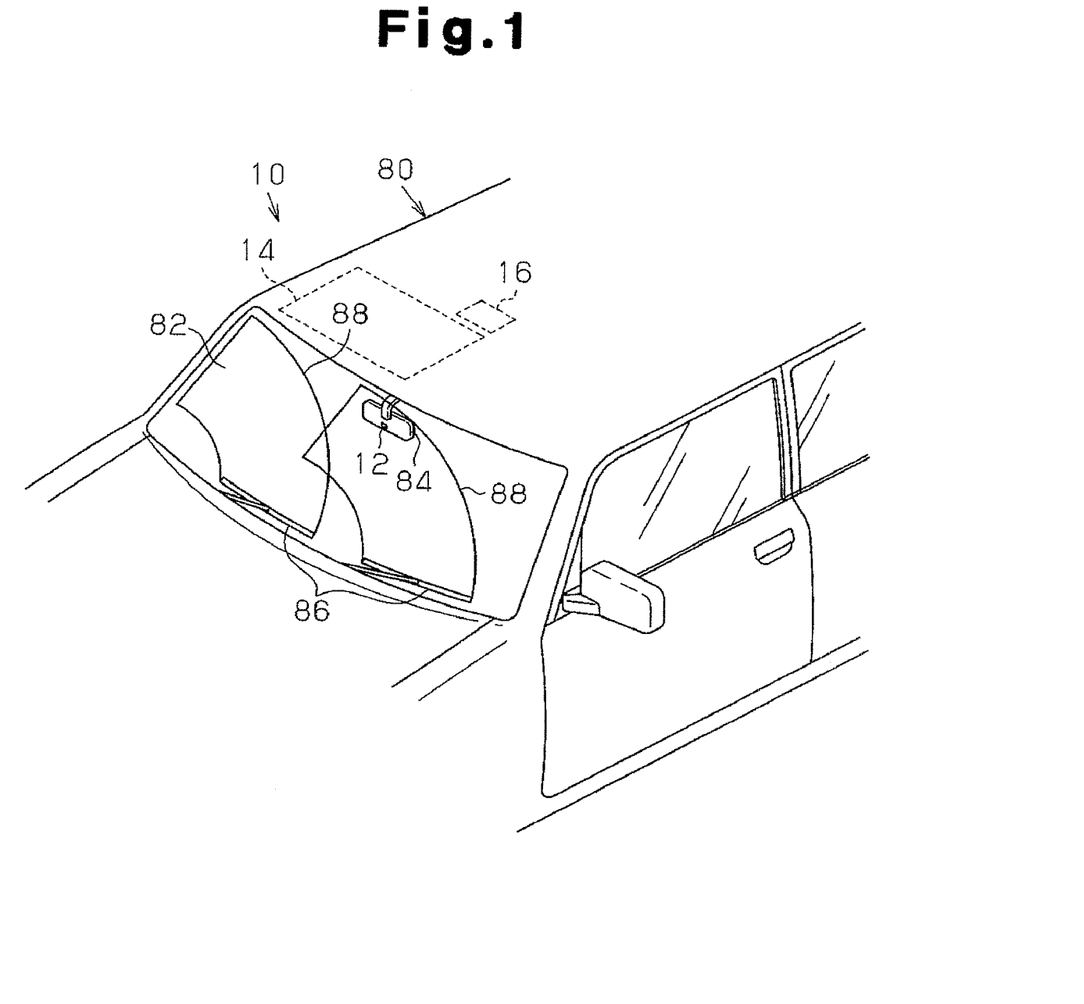
FIG. 1 is a perspective view showing a vehicle in which a vehicle sun visor apparatus according to a preferred embodiment of the present invention is installed.

As shown in FIG. 1, the vehicle sun visor apparatus 10 is installed in a vehicle (vehicle body) 80 such as a passenger automobile. The vehicle sun visor apparatus 10 includes a light receiving sensor 12, a light shield device 14, and a controller 16.

The light receiving sensor 12 is arranged on the surface of a rearview mirror 84, which is arranged in the vehicle compartment to face a windshield, or front glass 82. The vehicle 80 of the present embodiment includes a wiper apparatus 86 for wiping the outer surface of the front glass 82. A wipe area 88 is formed on the outer surface of the front glass 82 at the rear of the rearview mirror 84 (at the front side of the vehicle). The wipe area 88 is wiped by the wiper apparatus 86 arranged on the outer surface of the front glass 82. Thus, the light receiving sensor 12 faces the wipe area 88 of the outer surface of the front glass 82 that is wiped using the wiper apparatus 86. In other words, the light receiving sensor 12 is arranged within the wipe area 88 that is wiped using the wiper apparatus 86 as viewed in the direction perpendicular to the front glass 82.

Figure 2:
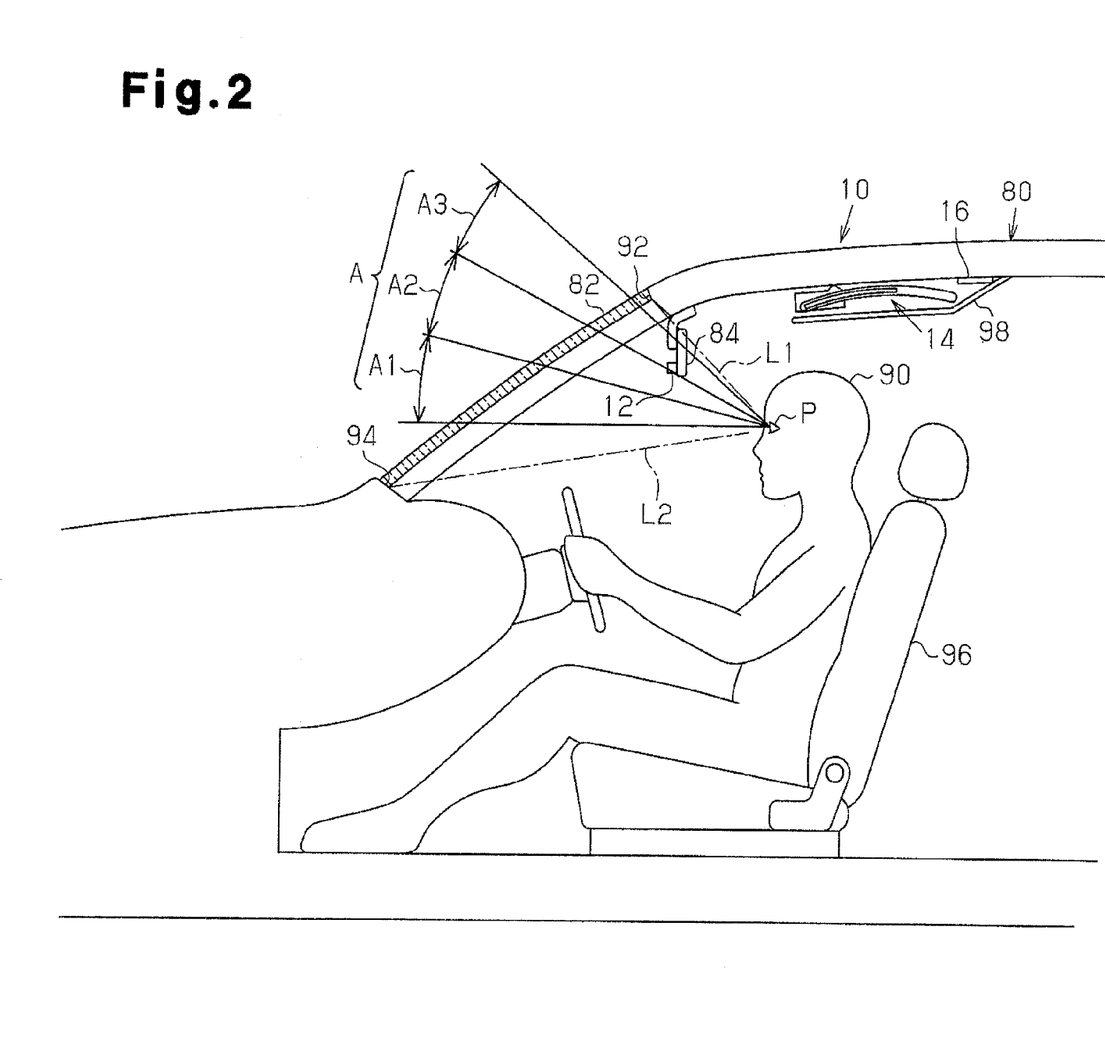
FIG. 2 is a side view showing the interior of the vehicle of FIG. 1.

The light receiving sensor 12 is arranged at a position between a first virtual line L1 and a second virtual line L2 as shown in FIG. 2. The first virtual line L1 is a line linking an upper rim 92 of the front glass 82 and an eye point P of an occupant 90 (driver) of the vehicle 80 viewed from the side of the vehicle. The second virtual line L2 is a line linking a lower rim 94 of the front glass 82 and the eye point P of the occupant 90 viewed from the side of the vehicle. The light receiving sensor 12 is arranged at such a position to ensure the receipt of incident light that passes through the front glass 82 and towards the eye point P of the occupant 90.

Here, the occupant 90 is assumed to have an average height and average body-build. The eye point P of the occupant 90 referred to here is the eye point when such an occupant 90 is seated at an appropriate position in a seat (driver seat) 96 of the vehicle 80.

Figure 3A:
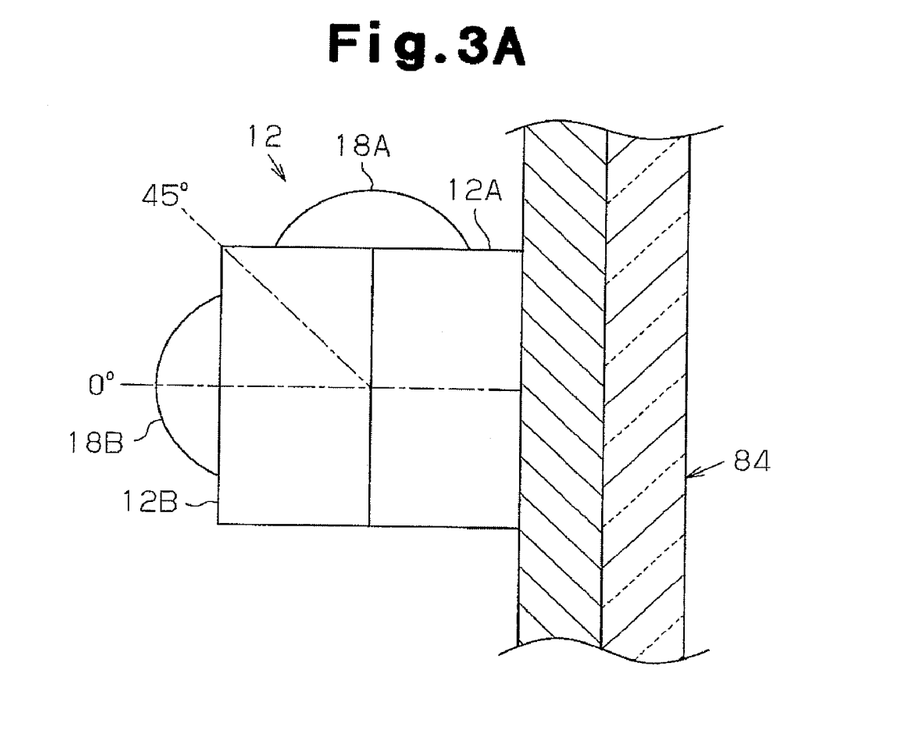
FIG. 3A is a side view of a light receiving sensor arranged on the rearview mirror shown in FIG. 1.

As shown in FIG. 3A, the light receiving sensor 12 is cubic, and has two light receiving surfaces. More specifically, the light receiving sensor 12 has an upper light receiving surface 12A and a front light receiving surface 12B. When the light receiving sensor 12 is set in the vehicle 80, the upper light receiving surface 12A is parallel to the floor surface of the vehicle 80 and faces upward, and the front light receiving surface 12B is perpendicular to the upper light receiving surface 12A and faces the front side of the vehicle 80. A light receiving element 12BA is arranged on the upper light receiving surface 12A. A light receiving element 18B is arranged on the front light receiving surface 12B. The light receiving elements 18A and 18B receive incident light that is incident upon the corresponding light receiving surfaces.

The light receiving sensor 12 receives, at its light receiving elements 18A and 18B, incident light of, for example, direct sunlight, which passes through the front glass 82. Then, the light receiving sensor 12 outputs, from its light receiving elements 18A and 18B, incident light detection signals S1 and S2 to the controller 16. The incident light detection signals S1 and S2 are set at levels proportional to the intensity of the incident light. The intensity of incident light changes depending on the incident angle of the light in the manner shown in FIG. 3B.

In the present embodiment, as shown in FIG. 2, a range A in the light shield device 14 shields vertical light is 0 to 45 degrees about a straight line that lies along the eye point P of the occupant 90 and extends parallel to the center line of the vehicle 80.

The vertical light shield range A is divided into three ranges, namely, a first vertical light shield range A1, a second vertical light shield range A2, and a third vertical light shield range A3. The first vertical light shield range A1 is a range of 0 to 15 degrees about the straight line that lies along the eye point P of the occupant 90 in the driver seat and extends parallel to the center line of the vehicle 80. The second vertical light shield range A2 is a range of 15 to 30 degrees about the straight line. The third vertical light shield range A3 is a range of 30 to 45 degrees about the straight line.

The light receiving sensor 12 outputs the incident light detection signals S1 and S2 for specifying the incident angle in the vertical direction. More specifically, the light receiving sensor 12 outputs, from its light receiving elements 18A and 18B arranged on the upper light receiving surface 12A and the front light receiving surface 12B that is 90 degrees from the upper light receiving surface 12A, the incident light detection signals S3 and S2 for specifying the incident angle of light that enters the vertical light shield range A.

Figure 4:
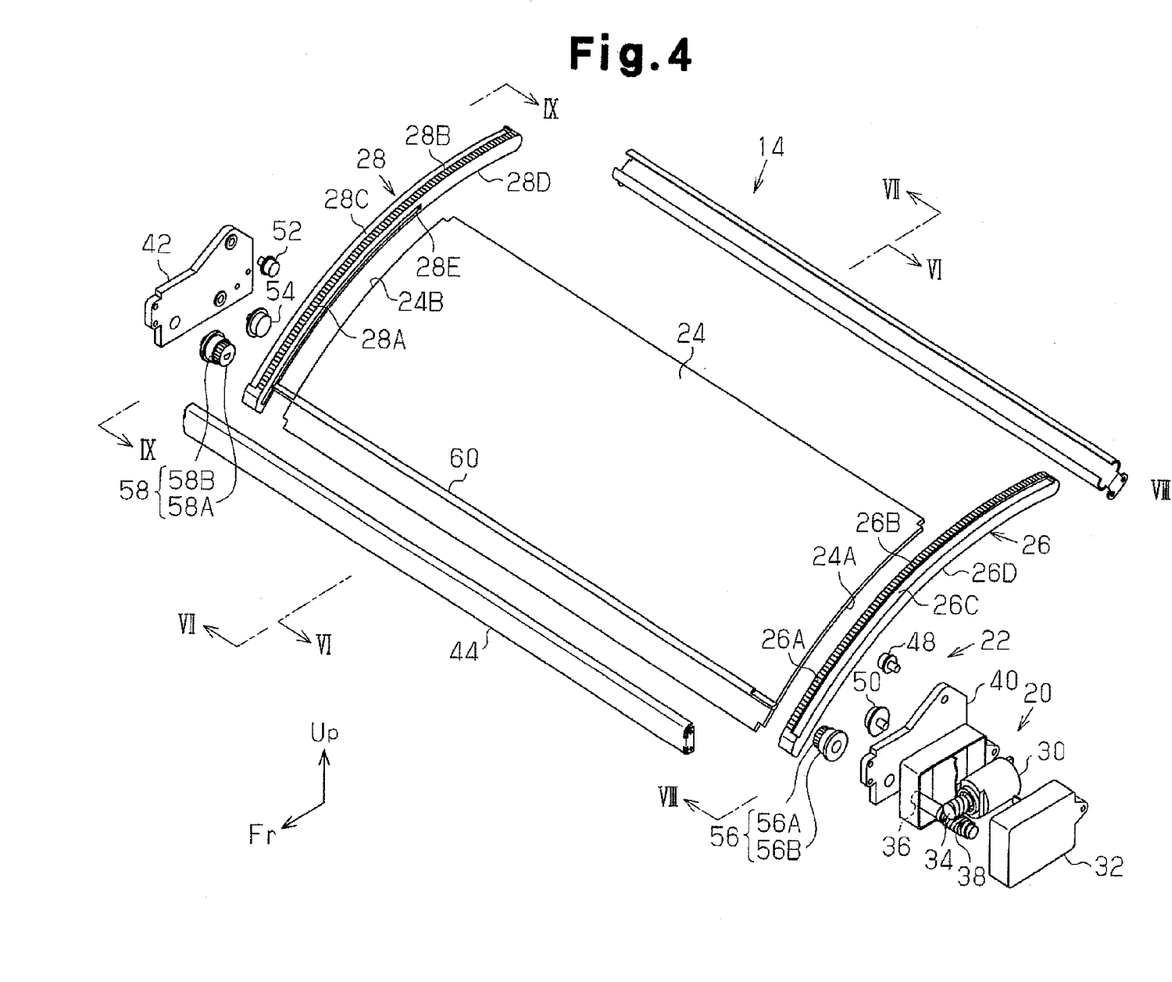
FIG. 4 is an exploded perspective view showing a light shield device included in the vehicle sun visor apparatus.
Figure 5:
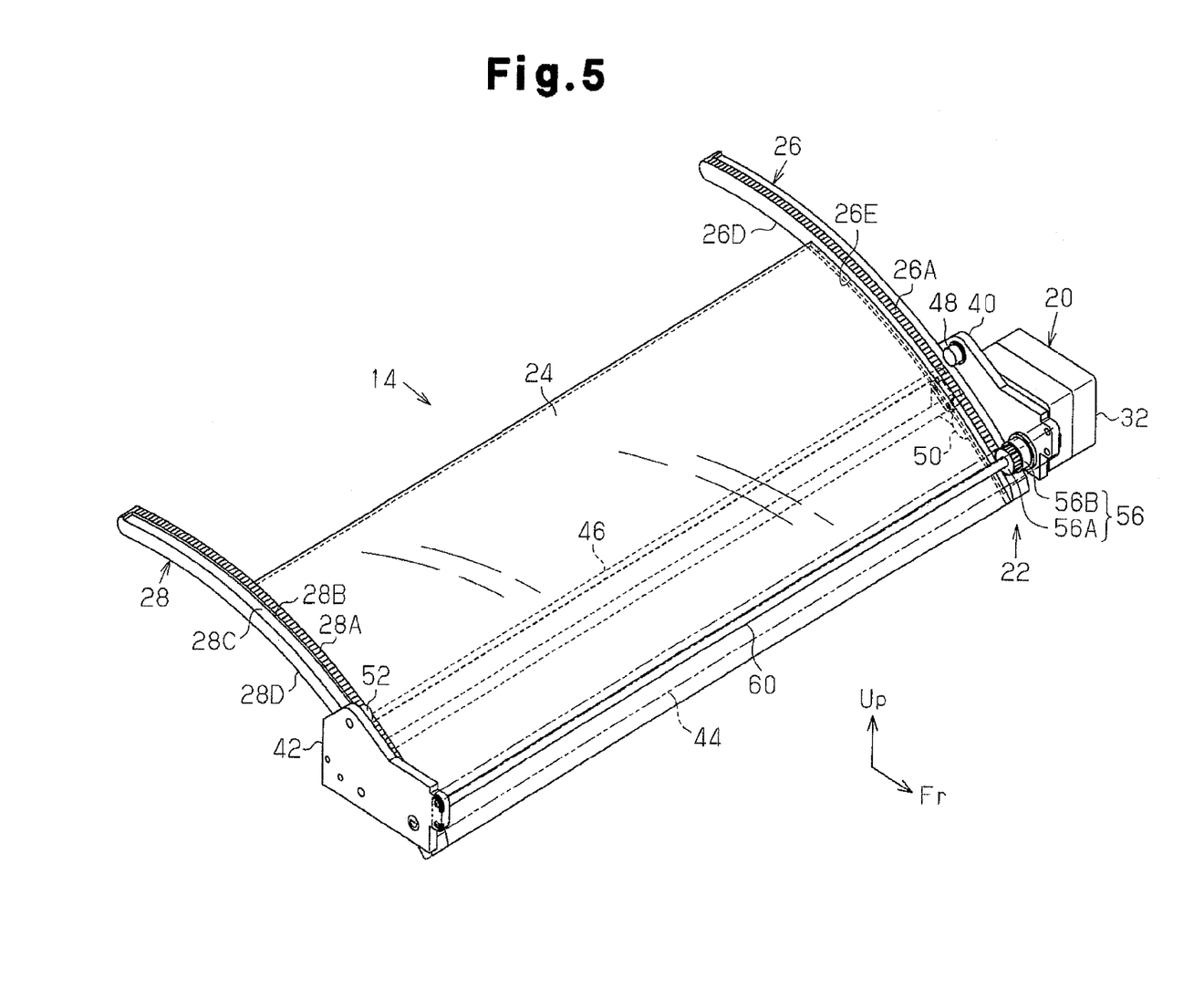
FIG. 5 is a perspective view showing the light shield device of FIG. 4.

As shown in FIG. 2, the light shield device 14 is accommodated in a roof portion 98 (the space between outer roof and inner roof panels) near the driver seat of the vehicle 80. As shown in FIGS. 4 and 5, the light shield device 14 includes a drive unit 20, an actuation mechanism 22, a light shield body 24, and first and second slide guides 26 and 28.

The drive unit 20 includes a drive motor 30. The drive motor 30 is accommodated in a housing 32. A rotation shaft of the drive motor 30 has a first gear (worm) 34. An output shaft 36 that is perpendicular to the rotation shaft of the drive motor 30 has a second gear (worm wheel) 38. The second gear 38 is engaged with the first gear 34.

The actuation mechanism 22 includes a pair of left and right brackets, namely, first and second brackets 40 and 42. The first and second brackets 40 and 42 are connected by a pair of connection frames 44 and 46, which extend in the lateral direction of the vehicle. The connection frames 44 and 46 connect the first and second brackets 40 and 42 at the front and rear sides with respect to the vehicle. An upper auxiliary roller 48 and a lower auxiliary roller 50 are set in a rotatable manner on the left first bracket 40. An upper auxiliary roller 52 and a lower auxiliary roller 54 are set in a rotatable manner on the right second bracket 42.

Figure 6:
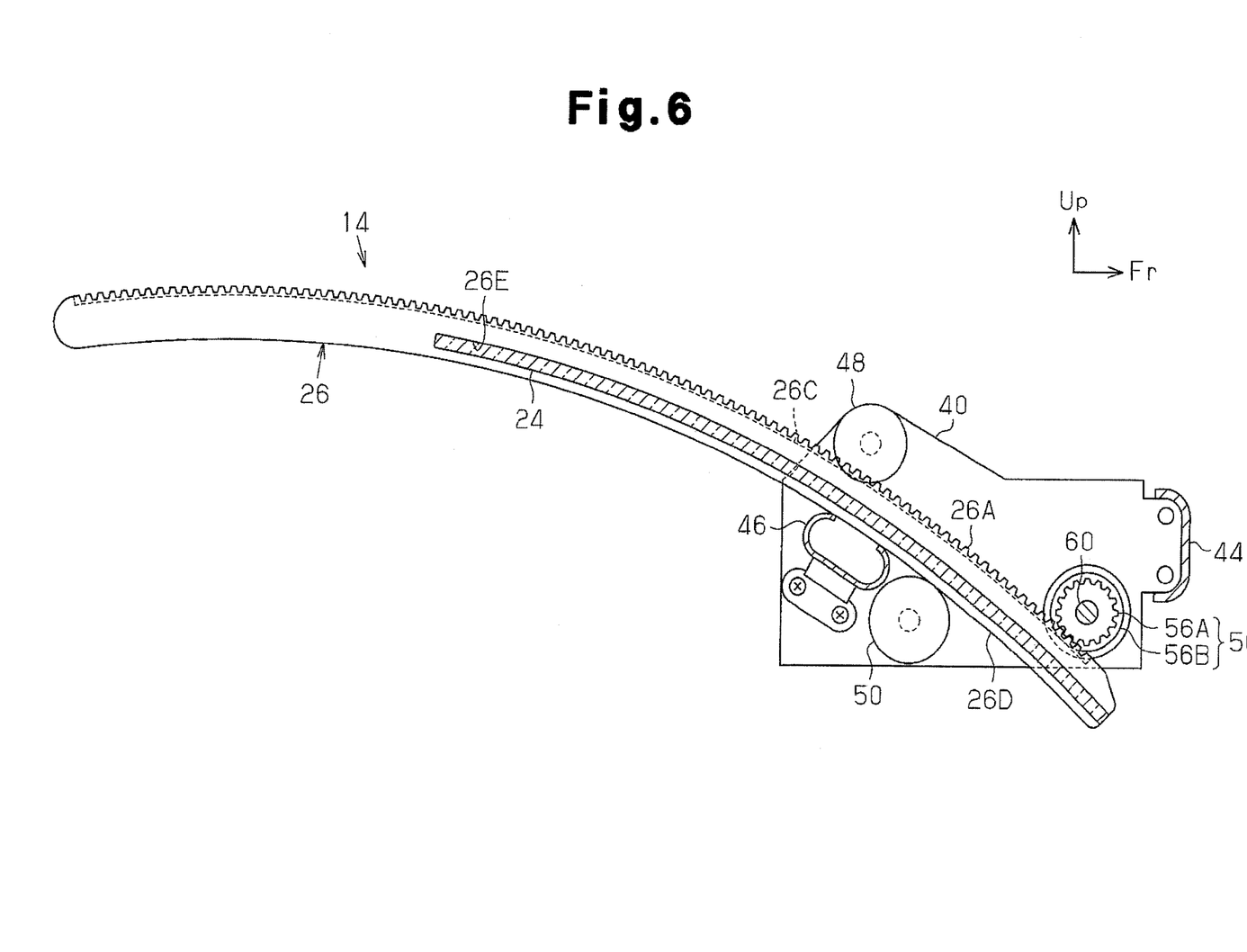
FIG. 6 is a cross-sectional view taken along line VI-VI in FIG. 4.

As shown in FIG. 6, the upper auxiliary roller 48 set on the first bracket 40 is arranged at the upper side of the first slide guide 26 and rotates while in contact with a first roll surface 26C of the first slide guide 26, which will be described later. The lower auxiliary roller 50 set on the first bracket 40 is arranged at the lower side of the first slide guide 26 and rotates while in contact with a second roll surface 26D of the first slide guide 26, which will be described later.

Figure 7:
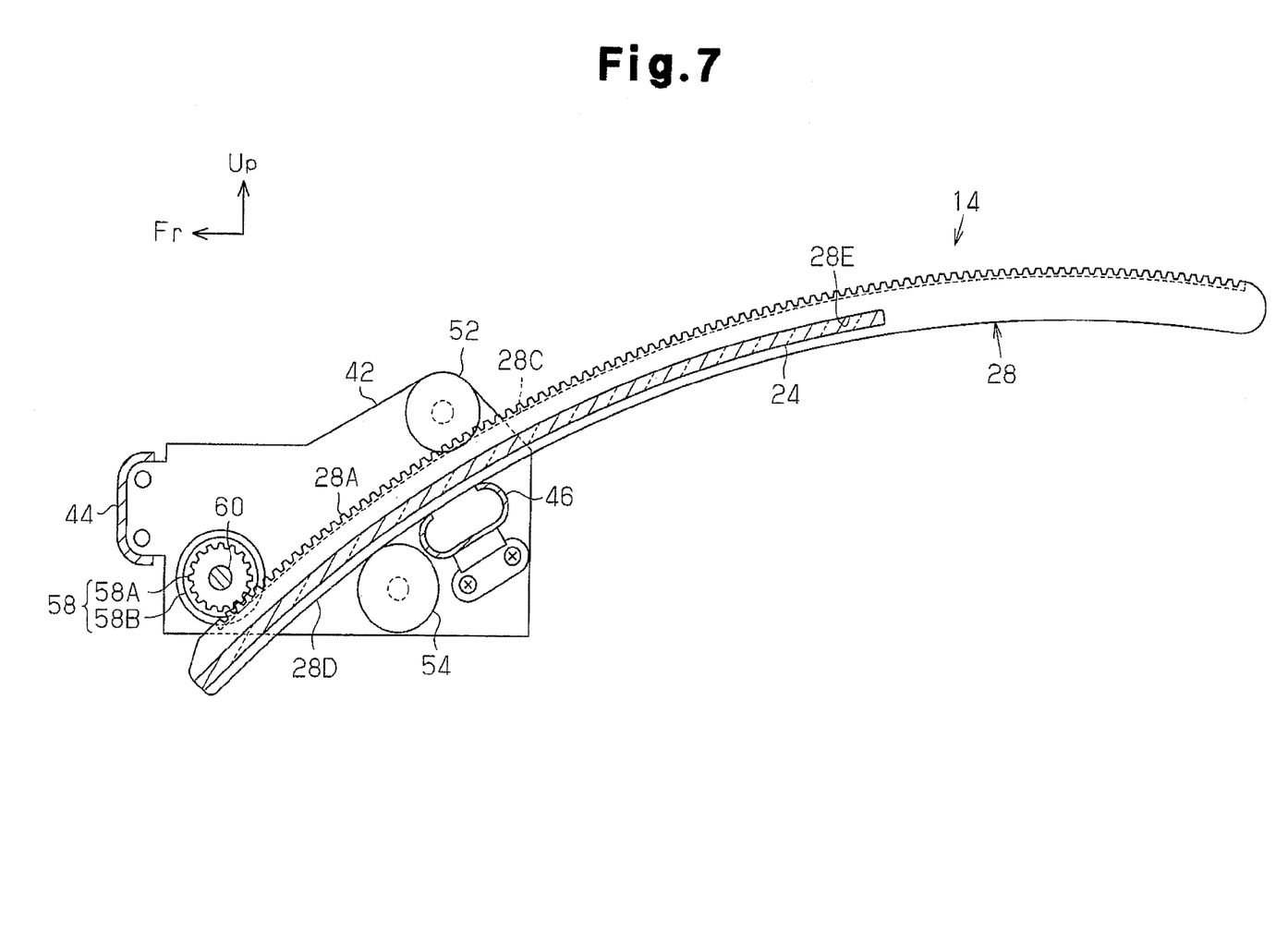
FIG. 7 is a cross-sectional view taken along line VII-VII in FIG. 4.

In the same manner, as shown in FIG. 7, the upper auxiliary roller 52 set on the second bracket 42 is arranged at the upper side of the second slide guide 28 and rotates while in contact with a first roll surface 28C of the second slide guide 28, which will be described later. The lower auxiliary roller 54 set on the second bracket 42 is arranged at the lower side of the second slide guide 28 and rotates while in contact with a second roll surface 28D of the second slide guide 28, which will be described later.

In the present embodiment, the upper auxiliary rollers 48 and 52 are made of resin so that they can be obtained at a low cost and be manufactured easily. The lower auxiliary rollers 50 and 54 are made of rubber so that they absorb vibrations during operation of the actuation mechanism 22. Further, the lower auxiliary rollers 50 and 54 are arranged at positions separated from first and second drive wheels 56 and 58, which will be described later, on opposite sides of the first and second slide guides 26 and 28 in the direction in which the first and second slide guides 26 and 28 move (track direction). As a result, the lower auxiliary rollers 50 and 54 cooperate with the first and second drive wheels 56 and 58 to hold the first and second slide guides 26 and 28 therebetween.

As shown in FIGS. 4 and 5, the housing 32 accommodating the drive motor 30 is fixed to the first bracket 40. The output shaft 36 of the drive unit 20 is inserted through the first bracket 40 in a rotatable manner. The first drive wheel 56 is arranged on a projected distal portion of the output shaft 36. The second drive wheel 58 is set on the second bracket 42 in a rotatable manner. The first drive wheel 56 and the second drive wheel 58 are fixed to a single rotation shaft 60. The first drive wheel 56 and the second drive wheel 58 are rotated in synchronism with the drive motor 30.

A first drive gear (pinion) 56A is formed at an inner side of the left first drive wheel 56 in the lateral direction of the vehicle. A first rotation roller 56B is formed coaxially with the first drive gear 56A at an outer side of the first drive wheel 56 in the lateral direction of the vehicle. In the present embodiment, the first drive gear 56A and the first rotation roller 56B of the first drive wheel 56 are formed integrally from a resin material. In the present embodiment, the first drive wheel 56 is formed as a stepped drive wheel, and the outer diameter of a circle along the distal ends of the teeth of the first drive gear 56A is set smaller than the outer diameter of the first rotation roller 56B.

The first drive gear 56A is meshed with a meshing surface (rack) 26A of the first slide guide 26, which will be described later. The first rotation roller 56B comes into contact with the first roll surface 26C of the first slide guide 26, which will be described later, during rotation of the first drive wheel 56 and supports the first slide guide 26.

In the same manner, a second drive gear (pinion) 58A is formed at an inner side of the right second drive wheel 58 in the lateral direction of the vehicle. A second rotation roller 58B is formed coaxially with the second drive gear 58A at an outer side of the second drive wheel 58 in the lateral direction of the vehicle. In the present embodiment, the second drive gear 58A and the second rotation roller 58B of the second drive wheel 58 are formed integrally from a resin material. In the present embodiment, the second drive wheel 58 is formed as a stepped drive wheel, and the outer diameter of the second drive gear 58A that is defined at the distal ends of the teeth is set smaller than the outer diameter of the second rotation roller 58B.

The second drive gear 58A is engaged with a meshing surface (rack) 28A of the second slide guide 28, which will be described later. The second rotation roller 58B comes into contact with the first roll surface 28C of the second slide guide 28, which will be described later, during rotation of the second drive wheel 58 and supports the second slide guide 28.

The light shield body 24 may completely block incident light of, for example, direct sunlight, which passes through the front glass 82 and enters the vehicle interior. However, in the present embodiment, the light shield body 24 is formed from a semi-transparent or colored-transparent resin material. The light shield body 24 using such a semi-transparent or colored-transparent material ensures the field of view for the occupant 90 while shielding incident light of, for example, direct sunlight, which passes through the front glass 82 and enters the vehicle interior.

The first and second slide guides 26 and 28 are arranged at the two sides of the light shield body 24, respectively. The first and second slide guides 26 and 28 are formed from a resin material and are symmetric to each other with respect to the light shield body 24. In the present embodiment, the first and second slide guides 26 and 28 are formed to be curved downward from the rear side to the front side of the vehicle so that when the drive unit 20 and the actuation mechanism 22 operate, the first and second slide guides 26 and 28 enable the light shield body 24 to move forward from the rear side to the front side of the vehicle and at the same time move from the upper side to the lower side of the vehicle to a position facing the occupant 90.

The light shield body 24, which is formed in correspondence with the curved shapes of the first and second slide guides 26 and 28, is curved downward from the rear side to the front side of the vehicle. In the present embodiment, the light shield body 24 does not have a front frame portion and a rear frame portion that are formed as separate members on the front edge and the rear edge. This improves the appearance of the entire peripheral portion of the light shield body 24.

In the present embodiment, the first and second slide guides 26 and 28 have fitting recesses 26E and 28E, which are fitted to fitting protrusions 24A and 24B that are formed on the two sides of the light shield body 24. The fitting protrusions 24A and 24B and the fitting recesses 26E and 28E are engaged with each other so that the first and second slide guides 26 and 28 are fixed to the two sides of the light shield body 24, respectively. The first and second slide guides 26 and 28 are formed to be longer than the light shield body 24 in the longitudinal direction of the vehicle and extend longer to the rear side of the vehicle than the light shield body 24.

Figure 8:
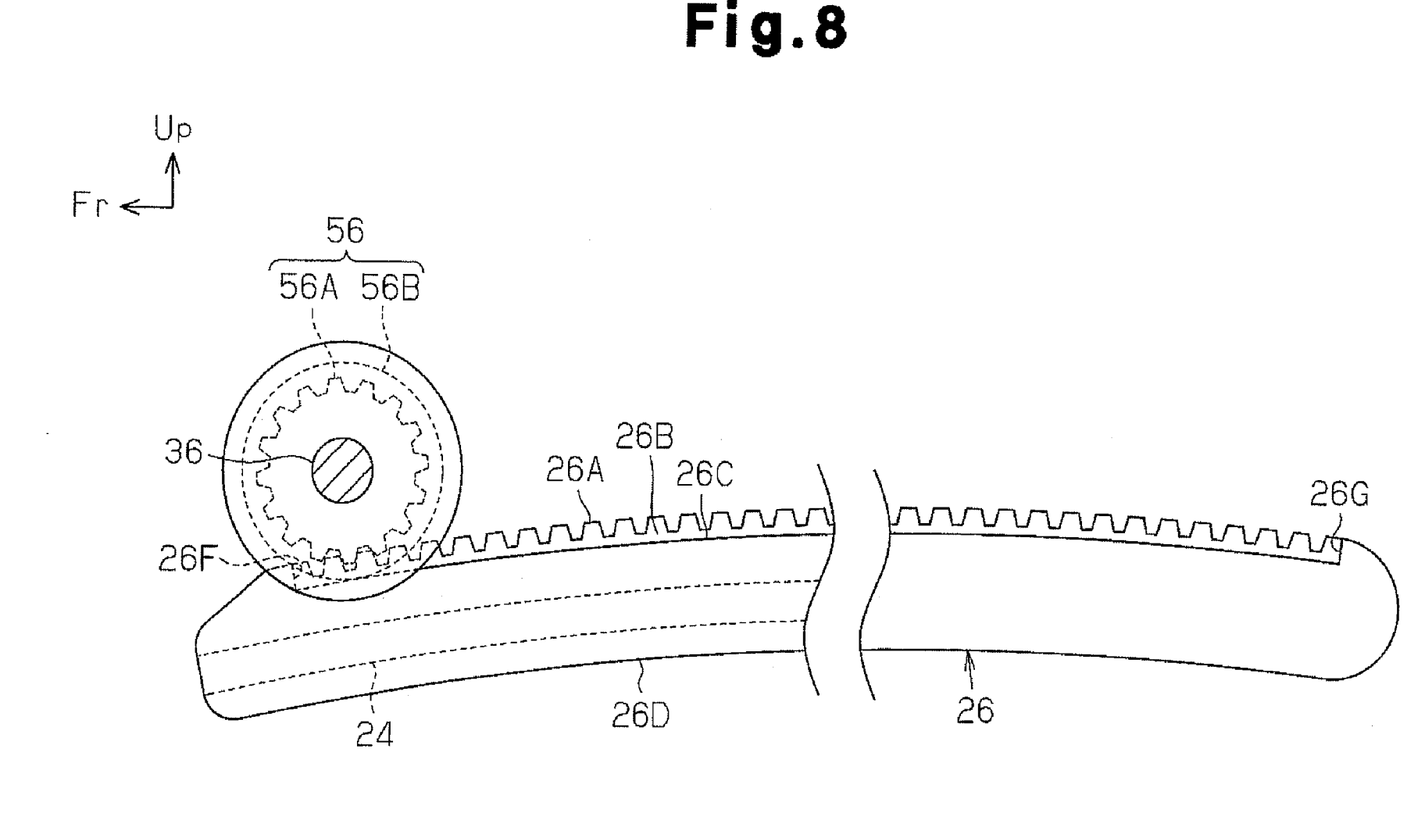
FIG. 8 is a cross-sectional view taken along line VIII-VIII in FIG. 4.

As shown in FIG. 8, the meshing surface 26A, which extends in the longitudinal direction of the left first slide guide 26, is formed at an inner side of an upper part of the first slide guide 26 in the vehicle lateral direction. The first roll surface 26C is formed at an outer side of the upper part of the first slide guide 26 in the vehicle lateral direction. The first roll surface 26C is formed at a position one step lower than the meshing surface 26A by way of a side surface 26B, which is arranged together with the meshing surface 26A and extends in the direction in which the light shield body 24 moves (movement direction). Further, the second roll surface 26D, which extends in the longitudinal direction of the first slide guide 26, is formed on a lower part of the first slide guide 26.

Figure 9:
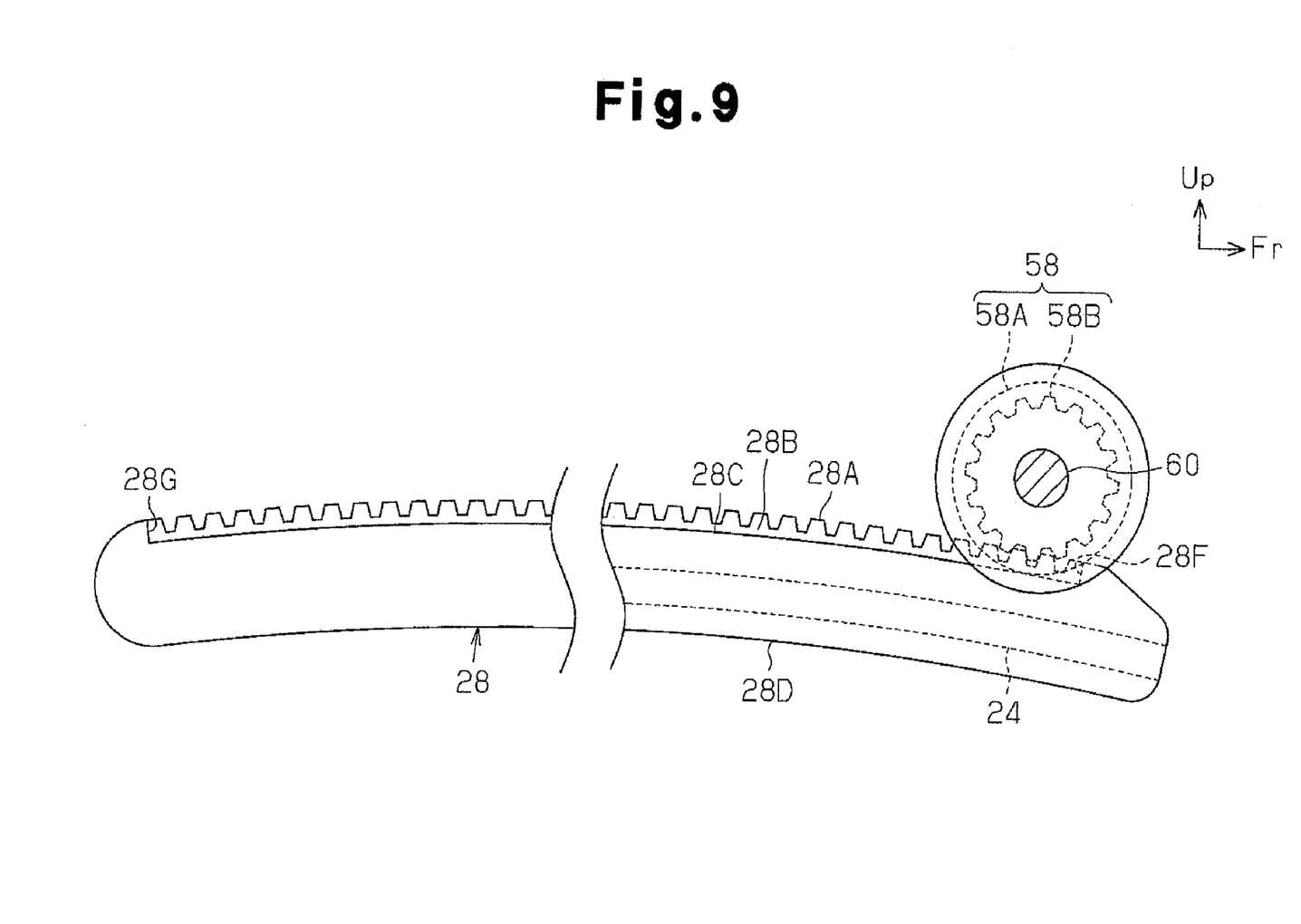
FIG. 9 is a cross-sectional view taken along line IX-IX in FIG. 4.

In the same manner, as shown in FIG. 9, the meshing surface 28A, which extends in the longitudinal direction of the right second slide guide 28, is formed aL an inner side of an upper part of the second slide guide 28 in the vehicle lateral direction. The first roll surface 28C is formed at an outer side of the upper part of the second slide guide 28 in the vehicle lateral direction. The first roll surface 28C is formed at a position one step lower than the meshing surface 28A by way of a side surface 28B, which is arranged together with the meshing surface 28A and extends in the direction in which the light shield body 24 moves. Further, the second roll surface 28D, which extends in the longitudinal direction of the second slide guide 28, is formed on a lower part of the second slide guide 28.

In the present embodiment, the first and second slide guides 26 and 28 are formed to have the curved shapes as described above. The meshing surfaces 26A and 28A, the first roll surfaces 26C and 28C, and the second roll surfaces 26D and 28D of the first and second slide guides 26 and 28 are formed to extend in the longitudinal direction of the first and second slide guides 26 and 28. In other words, the meshing surfaces 26A and 28A, the first roll surfaces 26C and 28C, and the second roll surfaces 26D and 28D are formed as curved tracks.

In the present embodiment, the first roll surface 26C of the first slide guide 26 is formed at the position one step lower than the meshing surface 26A by way of the side surface 26B as shown in FIG. 8. As a result, end surfaces 26F and 26G are formed at the two ends of the first slide guide 26 in the longitudinal direction, respectively. The end surfaces 26F and 26G are connected to the side surface 26B and the first roll surface 26C. The end surfaces 26F and 26G function as stoppers with which the first rotation roller 56B comes into contact before the first drive gear 56A reaches the two stroke ends of the meshing surface 26A.

In the same manner, the first roll surface 28C of the second slide guide 28 is formed at the position one step lower than the meshing surface 28A by way of the side surface 28B as shown in FIG. 9. As a result, end surfaces 28E and 28G are formed at the two ends of the second slide guide 28 in the longitudinal direction, respectively. The end surfaces 28F and 28G are connected to the side surface 28B and the first roll surface 28C. The end surfaces 28F and 28G function as stoppers with which the second rotation roller 58B comes into contact before the second drive gear 58A reaches the two stroke ends of the meshing surface 28A.

In the present embodiment, when the first and second drive wheels 56 and 58 reach the vehicle front side ends of the first and second slide guides 26 and 28 or the vehicle rear side ends of the first and second slide guides 26 and 28, the first and second rotation rollers 56B and 58B come into contact with the end surfaces 26F and 28F or the end surfaces 26G and 28G before the gear teeth of the first and second drive gears 56A and 58A rides onto the flat parts at the vehicle front side of the meshing surfaces 26A and 28A or the flat parts at the vehicle rear side of the meshing surfaces 26A and 28A. This prevents the gear teeth of the first and second drive gears 56A and 58A from being damaged.

In the present embodiment, the vehicle front side stroke end of the first roll surface 26C of the first slide guide 26 and the vehicle front side stroke end of the meshing surface 26A coincide with each other in the movement direction of the light shield body 24 as shown in FIG. 8. In the same manner, the vehicle front side stroke end of the first roll surface 28C of the second slide guide 28 and the vehicle front side stroke end of the meshing surface 28A coincide with each other in the movement direction of the light shield body 24 as shown in FIG. 9. This improves the appearance of the side parts of the first and second slide guides 26 and 28 at front side of the vehicle when the light shield body 24 is moved to a half extended position or to a completely extended position, which will be described later.

In the present embodiment, the vehicle rear side stroke end of the first roll surface 26C of the first slide guide 26 and the vehicle rear side stroke end of the meshing surface 26A coincide with each other in the movement direction of the light shield body 24 as shown in FIG. 8 In the same manners the vehicle rear side stroke end of the first roll surface 28C of the second slide guide 28 and the vehicle rear side stroke end of the meshing surface 28A coincide with each other in the movement direction of the light shield body 24 as shown in FIG. 9.

Figure 10:
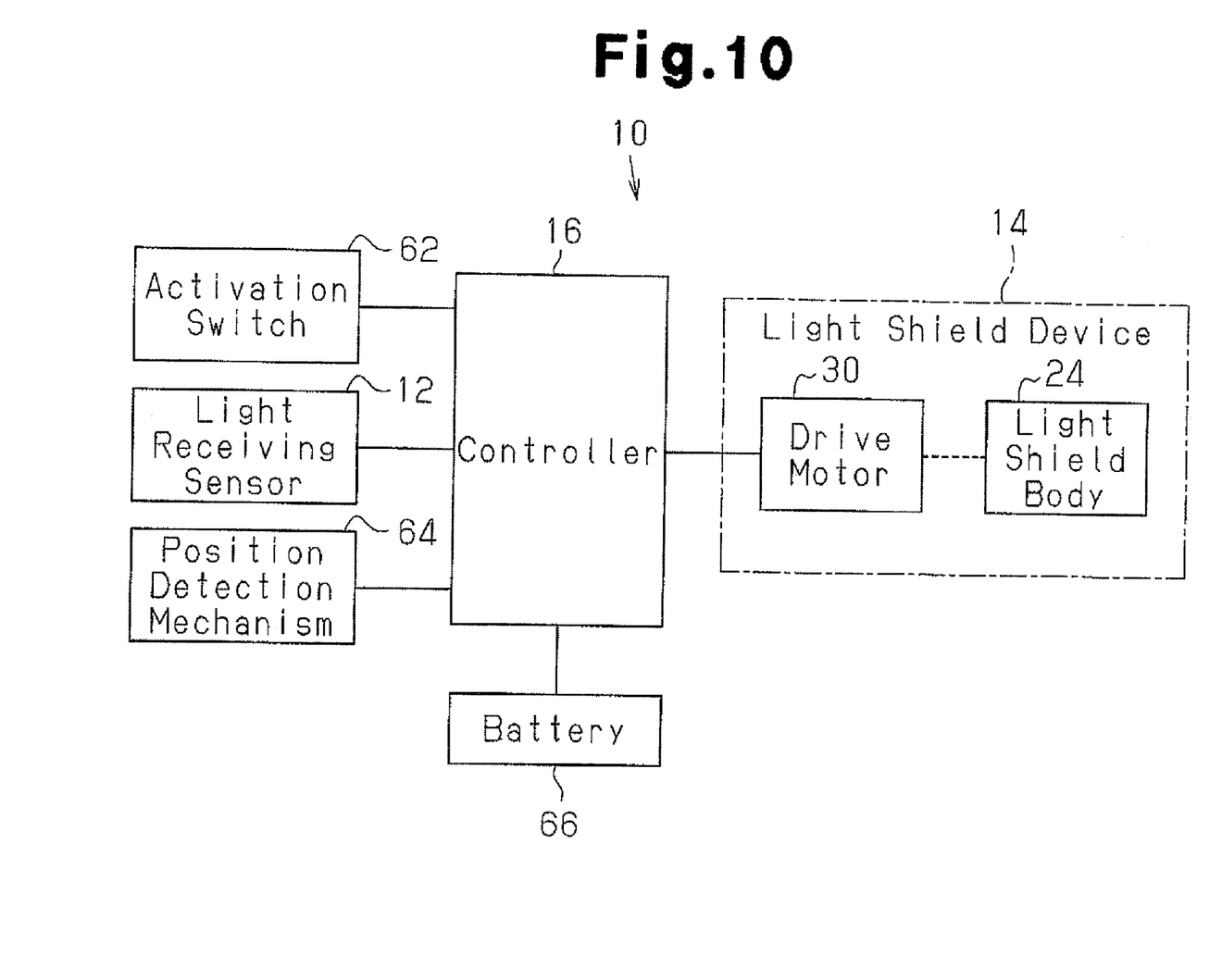
FIG. 10 is a block diagram showing the electrical structure of the vehicle sun visor apparatus.

In the present embodiment, the controller 16 is accommodated in the roof portion 98 near the driver seat of the vehicle 80 as shown in FIG. 2. The light receiving sensor 12, an activation switch 62, a position detection mechanism 64, and a battery 66 are connected to an input unit of the controller 16 as shown in FIG. 10. The drive motor 30 of the light shield device 14 is connected to an output unit of the controller 16.

Figure 3B:
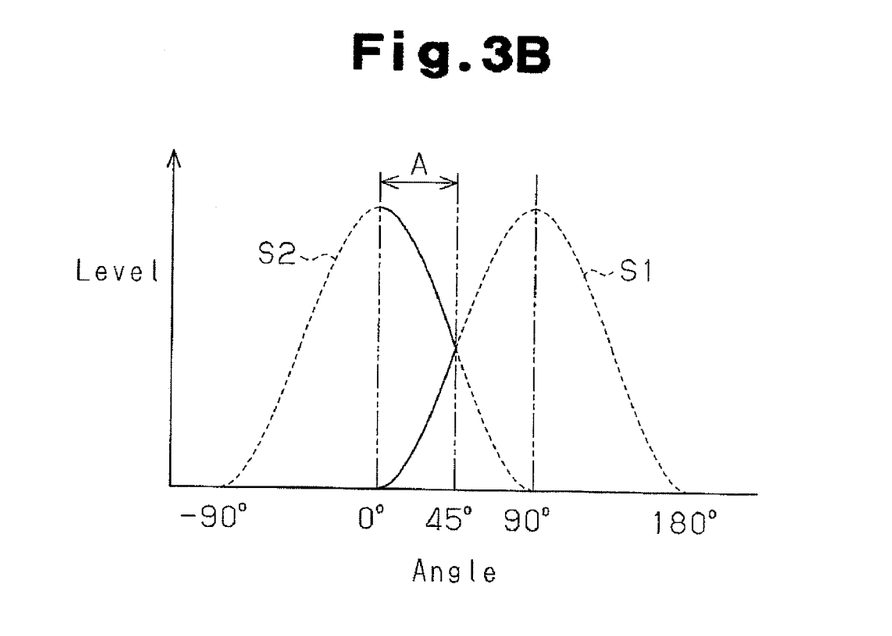
FIG. 3B is a graph showing the relationship between the level of each incident light detection signal output from the light receiving sensor of FIG. 3A and the incident angle of light.

The controller 16 prestores data on incident light that is received by the light receiving elements 18A and 18B, which are arranged on the upper light receiving surface 12A and the front light receiving surface 12B. More specifically, the controller 16 prestores data showing the relationship between each incident angle in the vertical direction and the levels of the incident light detection signals S1 and S2 that are output in proportion to the intensity of light incident at that incident angle. FIG. 3B shows one example of such data. The controller 16 determines the incident angle of incident light based on the ratio of the levels of the incident angle detection signals S1 and S2 output from the light receiving elements 18A and 18B.

The position detection mechanism 64 includes a rotary encoder, a variable resistor, a rotary switch, and a limit switch to detect and distinguish when the light shield body 24 is located at a completely extended position, a half extended position, or a retracted position. When the light shield body 24 is at the completely extended position, the half extended position, or the retracted position, the position detection mechanism 64 outputs a position detection signal indicating the detected position to the controller 16. Based on the position detection signal, the controller 16 distinguishes the light shield body 24 being in a completely extended state, the half extended position, and the retracted state.

The operation of the vehicle sun visor apparatus 10 of the present embodiment will now be described When the activation switch 62 is turned on, the controller 16 is supplied with drive power from the battery 66 and activated. The light receiving sensor 12 is also supplied with power and activated. When incident light of, for example, direct sunlight passes through the front glass 82 and enters the vertical light shield range A, the light receiving elements 18A and 18B of the light receiving sensor 12 output to the controller 16 the incident light detection signals S1 and S2 having levels proportional to the incident light intensity, which changes in accordance with the incident angle of the incident light in the manner shown in FIG. 3B.

Based on the incident light detection signals S1 and S2 output from the light receiving elements 18A and 18B of the light receiving sensor 12, the controller 16 specifies the incident angle in the vertical direction using the data showing the relationship between each incident angle in the vertical direction and the levels of the incident light detection signals S1 and S2 that are proportional to the intensity of the light that is incident at that incident angle.

Subsequently, the controller 16 determines whether the light shield body 24 is to be set in the completely extended state in which the light shield body 24 is completely extended, the half extended state in which the light shield body 24 is halfway extended, or the retracted state in which the light shield body 24 is completely retracted into the roof portion 98. The controller 16 performs this determination based on the vertical-direction incident angle of the incident light that enters the vertical light shield range A.

Figure 11A:
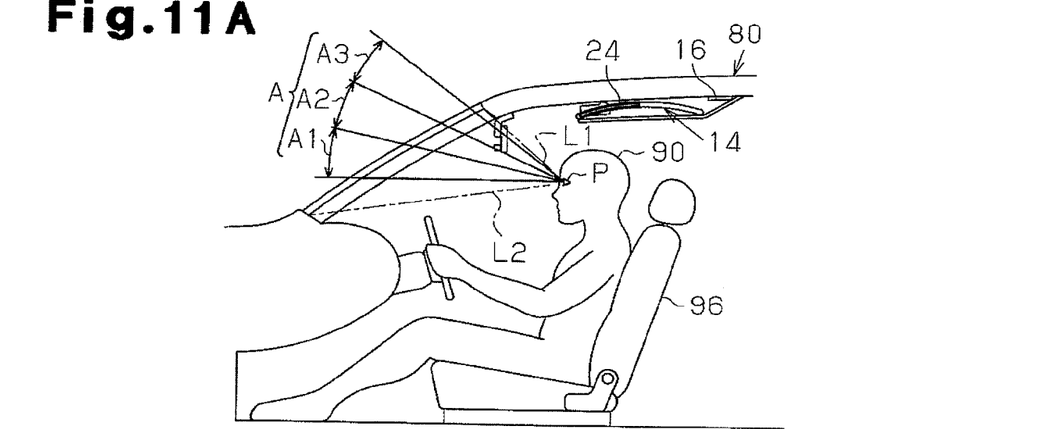
FIG. 11A is a side view showing the light shield body shown in FIG. 2 in a retracted state.
Figure 11B:
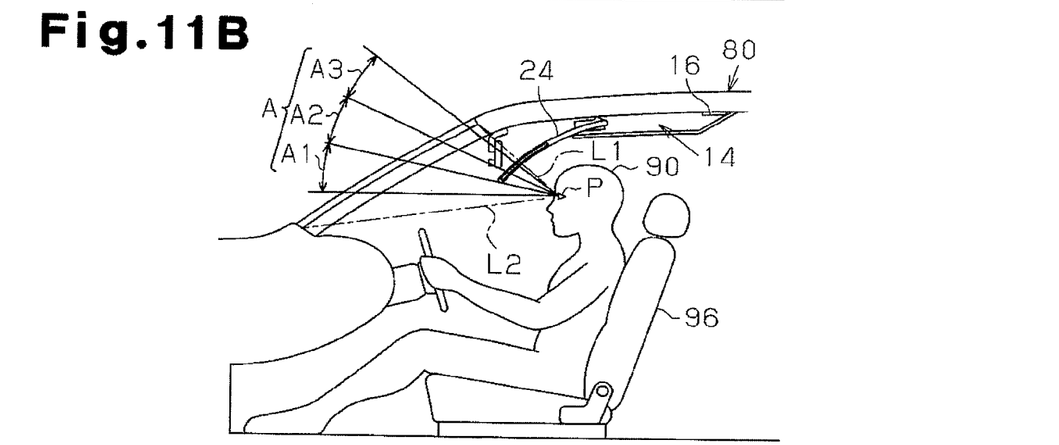
FIG. 11B is a side view showing the light shield body shown in FIG. 2 in a half extended state.
Figure 11C:
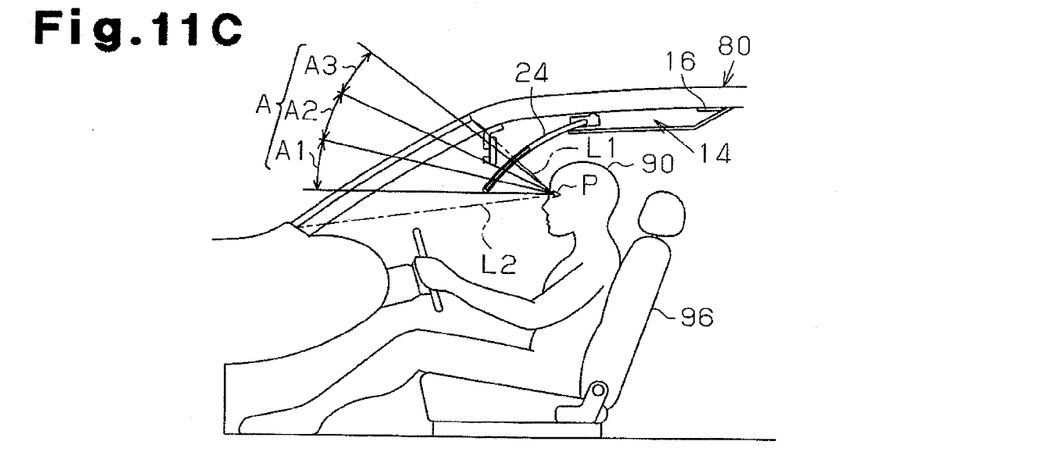
FIG. 11C is a side view showing the light shield body shown in FIG. 2 in a completely extended state.

More specifically, the controller 16 maintains the light shield body 24 in the retracted state as shown in FIG. 11A when the incident light enters the third vertical light shield range A3. The controller 16 sets the light shield body 24 in the half extended state as shown in FIG. 11B when the incident light enters the second vertical light shield range A2. The controller 16 sets the light shield body 24 in the completely extended state as shown in FIG. 11C when the incident light enters the first vertical light shield range A1. The controller 16 sets the light shield body 24 in the retracted state when the incident light enters areas that are not within the vertical light shield range A1.

The controller 16 drives the drive motor 30 when determining that the light shield body 24 is to be set in the half extended state or the completely extended state. The first and second drive wheels 56 and 58 rotate when the drive motor 30 is driven. As the first and second drive wheels 56 and 58 rotate when the drive motor 30 produces rotation, the meshing surfaces 26A and 28A of the first and second slide guides 26 and 28 that are meshed with the first and second drive gears 56A and 58A of the first and second drive wheels 56 and 58 are moved toward the front of the vehicle. The light shield body 24 moves toward the front of the vehicle together with the first and second slide guides 26 and 28.

In this state, the first roll surfaces 26C and 28C formed on the upper parts of the first and second slide guides 26 and 28, which are respectively arranged on the two sides of the light shield body 24 in the vehicle lateral direction, are supported by the first and second rotation rollers 56B and 58B of the first and second drive wheels 56 and 58 and the upper auxiliary rollers 48 and 52 that rotate while in contact with the first roll surfaces 26C and 28C. Further, the second roll surfaces 26D and 28D formed on the lower parts of the first and second slide guides 26 and 28 are supported by the lower auxiliary rollers 50 and 54 that rotate while in contact with the second roll surfaces 26D and 28D.

Accordingly, in the present embodiment, the first and second slide guides 26 and 28 are supported by the upper auxiliary rollers 48 and 52, the first drive wheels 56 and 58, and the lower auxiliary rollers 50 and 54 and held between the upper auxiliary rollers 48 and 52 and the first drive wheels 56 and 58, and the lower auxiliary rollers 50 and 54 in the vertical direction. In this state, the first and second slide guides 26 and 28 are supported with the load being low and the produced noise being low. The light shield body 24 slides together with the first and second slide guides 26 and 28.

When the light shield body 24 is set in the half extended state or in the completely extended state, the position detection mechanism 64 detects the half extended state or the completely extended state of the light shield body 24. The position detection mechanism 64 outputs a position detection signal showing the half extended state or the completely extended state to the controller 16. As a result, the controller 16 detects that the shifting of the light shield body 24 into the half extended state or the completely extended state has been completed and stops driving the drive motor 30.

The driving condition of the vehicle may change and incident light may enter the first vertical light shield range A1 when the light shield body 24 is in the half extended state. In this case, the light shield body 24 is shifted to the completely extended state as shown in FIG. 11C. In this state, the position detection mechanism 64 detects the completely extended state of the light shield body 24 and the controller 16 stops driving the drive motor 30 when detecting that the shifting of the light shield body 24 to the completely extended state has been completed.

The driving condition of the vehicle may change and incident light may enter the second vertical light shield range A2 when the light shield body 24 is in the completely extended state. In this case, the light shield body 24 is set in the half extended state as shown in FIG. 11B to ensure the field of view for the occupant 90. Further, the driving condition of the vehicle may change and incident light may enter the third vertical light shield range A3 or incident light may enter areas that are not within the vertical light shield range A when the light shield body 24 is in the completely extended state or the half extended state. In this case, the light shield body 24 is set in the retracted state as shown in FIG. 11A to ensure the field of view for the occupant 90. The position detection mechanism 64 detects the half extended state or the retracted state of the light shield body 24, and the controller 16 stops driving the drive motor 30 upon detecting that the shifting of the light shield body 24 to the half extended state or the retracted state has been completed.

In the same manner as described above, the controller 16 thereafter sets the light shield body 24 in the retracted state as shown in FIG. 11A when incident light enter areas that are not within the vertical light shield range A or when incident light enters the third vertical light shield range A3, and sets the light shield body 24 in the half extended state as shown in FIG. 11B when incident light enters the second vertical light shield range A2. The controller 16 sets the light shield body 24 in the completely extended state as shown in FIG. 11C when incident light enters the first vertical light shield range A1. In this manner, the vehicle sun visor apparatus 10 of the present embodiment moves the light shield body 24 forward by a different amount in accordance with the incident angle of incident light in the vertical direction.

When the incident angle of incident light entering the vertical light shield range A changes frequently due to changes in the driving condition of the vehicle, it is preferable that the position of the light shield body 24 be changed when the incident angle of incident light becomes substantially fixed for a certain period of time (when the incident angle of light is stabilized).

The vehicle sun visor apparatus 10 has the advantages described below.

(1) In the vehicle sun visor apparatus 10 of the present embodiment, based on the incident angle of light in the vertical direction, the controller 16 controls the extended amount for the light shield body 24 of the light shield device 14 in three states, the completely extended state in which the light shield body 24 is completely extended, the half extended state in which the light shield body 24 is half extended, and the retracted state in which the light shield body 24 is completely retracted in the roof portion 98. Thus, the light shield body 24 is not extended to an area that does not require light shielding. In other words, the light shield body 24 shields only areas that are required to be shielded from incident light.

(2) The light receiving sensor 12 is arranged in the vehicle compartment facing the wipe area 88 on the outer surface of the front glass 82 that is wiped by the wiper apparatus 86. Thus, even if the front glass is stained by mud or bird feces, this would not interfere with the incident light entering the light receiving sensor 12 since such stains may be wiped off with the wiper apparatus 86. This enables accurate detection of incident light with the light receiving sensor 12. The light receiving sensor 12 therefore outputs the incident light detection signals S1 and S2, which accurate correspond to the incident light. This properly moves the light shield body 24 forward and rearward based on the incident light detection signals Si and S2.

(3) When viewed from the side of the vehicle, the light receiving sensor 12 is located under the first virtual line L1 and above the second virtual line L2. The first virtual line L1 connects the upper rim 92 of the front glass 82 and the eye point P of the occupant 90. The second virtual line L2 connects the lower rim 94 of the front glass 82 and the eye point P of the occupant 90. This arrangement ensures that the light receiving sensor 12 receives the incident light that passes through the front glass 82 toward the eye point P of the occupant 90. As a result, the light shield body 24 properly shields the incident light that passes through the front glass 82 toward the eye point P of the occupant 90.

(4) When viewed from a direction orthogonal to the front glass 82, the light receiving sensor is arranged in the wipe area 88 wiped by the wiper apparatus 86. Accordingly, even thought the light receiving sensor 12 is spaced from the inner surface of the front glass 82, the light receiving sensor 12 accurately receives incident light within a predetermined angular range. The predetermined angular range is set based on reference incident light, which enters the front glass 82 in the direction orthogonal to the front glass 82.

(5) The light receiving sensor 12 is arranged on the surface of the rearview mirror 84 facing toward the front glass 82. Accordingly, the light receiving sensor 12 is arranged in the light receiving sensor 12 without interfering with the view of the driver more than the rearview mirror 84.

It should be apparent to those skilled in the art that the present invention may be embodied in many other specific forms without departing from the spirit or scope of the invention. Particularly, it should be understood that the present invention may be embodied in the following forms.

Figure 12:
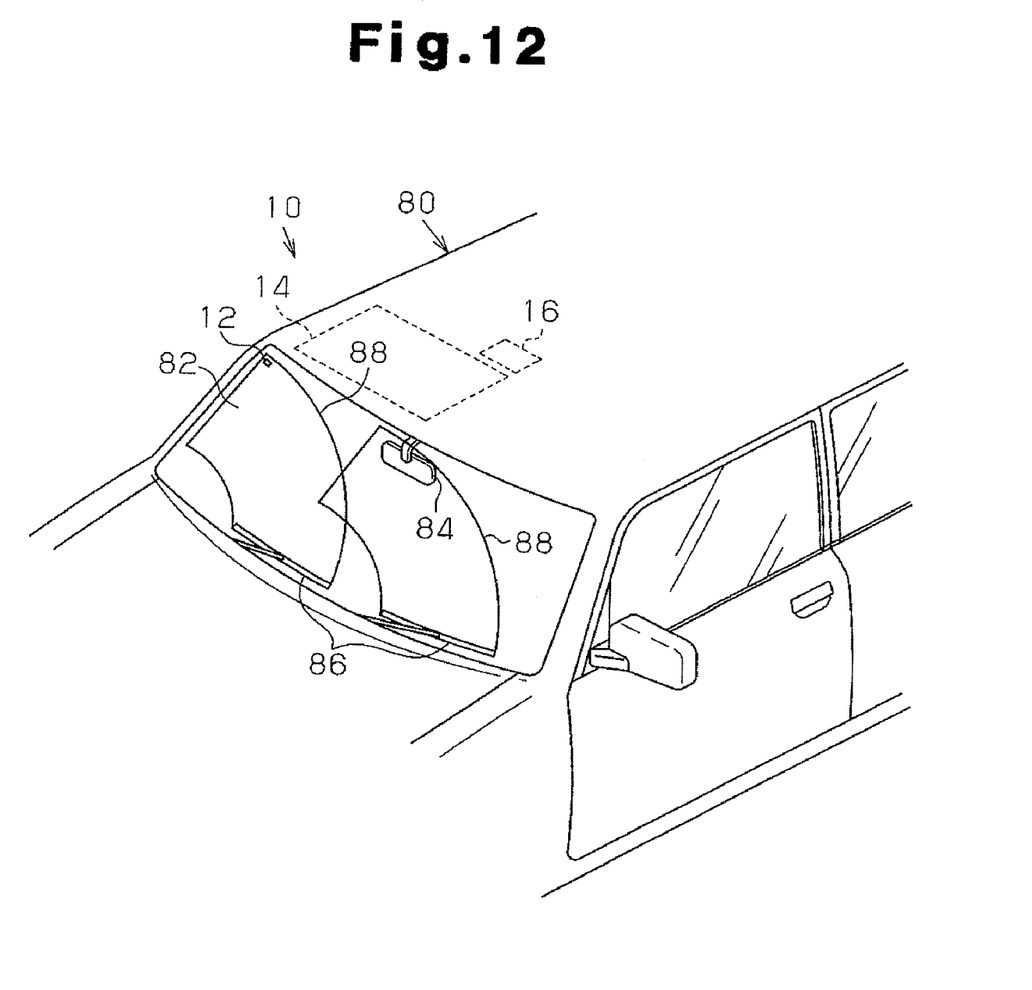
FIG. 12 is a perspective view showing a modification for the arrangement of the light receiving sensor according to the present invention.

In the preferred embodiment, the light receiving sensor 12 is arranged on the surface of the rearview mirror 84 facing toward the front glass 82. Thus, the light receiving sensor 12 faces toward the wipe area 88 on the outer surface of the front glass 82 wiped by the wiper apparatus 86. However, the light receiving sensor 12 may be attached to the inner surface of the front glass 82, or the inner side of the front glass 82 located in the vehicle compartment. In such a case, the light receiving sensor 12 would be located at a position facing toward the wipe area 88 of the front glass 82.

In the preferred embodiment, light shield control is performed by setting the extended amount of the light shield body 24 in the three stages of fully closed, half closed, and fully open. However, the present invention is not limited in such a manner, and light shield control may be executed by setting the extended amount of the light shield body 24 in, for example, four or more stages or in a continuous manner. This would enable finer light shield control in the vertical direction and further facilitate accurate light shielding of the area that should be shielded from light. Further, an adjustment switch may be used to adjust the extended amount of the light shield body 24. In such cases, the sun visor apparatus 10 would shield out incident light in accordance with the extended amount of the light shield body 24.

In the preferred embodiment, the single light receiving sensor 12 is used to execute light shield control for the single light shield body 24 arranged in front of the driver seat. However, the present invention is not limited in such a manner and the light shield control may be executed for a plurality of the light shield bodies 24 with a single light receiving sensor 12. For example, the plurality of light shield bodies 24 may be arranged in front and besides the driver seat and in front and beside the passenger seat. The light receiving sensor 12 would receive incident light from the front and side of the vehicle and output an incident light detection signal.

In the light receiving sensor 12, the light receiving element 18A is arranged on the upper light receiving surface 12A, which is generally parallel to the floor surface, and the light receiving element 18B is arranged on the front light receiving surface 12B, which is orthogonal to the upper light receiving surface 12A. However, the upper light receiving surface 12A and the front light receiving surface 12B do not have to be arranged at a right angle and may be arranged at any angle relative to each other as long as the controller 16 can recognize the angle.

The present examples and embodiments are to be considered as illustrative and not restrictive, and the invention is not to be limited to the details given herein, but may be modified within the scope and equivalence of the appended claims.

What is claimed is:

1. A sun visor apparatus for use in a vehicle having a body, a vehicle compartment, a windshield, and a wiper apparatus for wiping a wipe area of the windshield, the sun visor apparatus comprising:
   a drive motor mountable to the body of the vehicle;
   a light shield body moveable forward and rearwards by the drive motor, wherein the light shield body shields out some incident light entering the vehicle compartment of the vehicle through the windshield;
   a light receiving sensor for receiving the incident light and producing an incident light detection signal, wherein the light receiving sensor is arranged in the vehicle compartment of the vehicle, wherein the light receiving sensor is arranged to face toward the wipe area; and
   a controller for receiving the light detection signal and driving the drive motor based on the incident light detection signal.

2. The sun visor apparatus according to claim 1, wherein the vehicle includes a rearview mirror arranged in the vehicle compartment, with the rearview mirror having a surface facing toward the windshield, and the light receiving sensor arranged on the surface.

3. The sun visor apparatus according to claim 1, wherein when viewed from the side of the vehicle, the light receiving sensor is located under a first virtual line, which connects an upper rim of the windshield and an eye point of an occupant in the vehicle compartment, and above a second virtual line, which connects a lower rim of the windshield and the eye point of the occupant.

4. The sun visor apparatus according to claim 1, wherein the light receiving sensor is arranged in the wipe area when viewed in a direction orthogonal to the windshield.

5. The sun visor according to claim 1, wherein:
   the light shield body extends toward the windshield from the vehicle body; and
   the controller drives the drive motor such that the extended amount of the light shield body changes in accordance with an incident angle of the incident light in the vertical direction.

* * * * *

UNITED STATES PATENT AND TRADEMARK OFFICE
CERTIFICATE OF CORRECTION

PATENT NO. : 7,328,931 B2  Page 1 of 1
APPLICATION NO. : 11/423341
DATED : February 12, 2008
INVENTOR(S) : Sahara et al.

It is certified that error appears in the above-identified patent and that said Letters Patent is hereby corrected as shown below:

Column 6, line 32, delete "aL" and insert therefor --at--.

Signed and Sealed this

Tenth Day of June, 2008

JON W. DUDAS
*Director of the United States Patent and Trademark Office*